Oct. 15, 1940.  L. WARD  2,217,928
FISHHOOK
Filed March 23, 1939
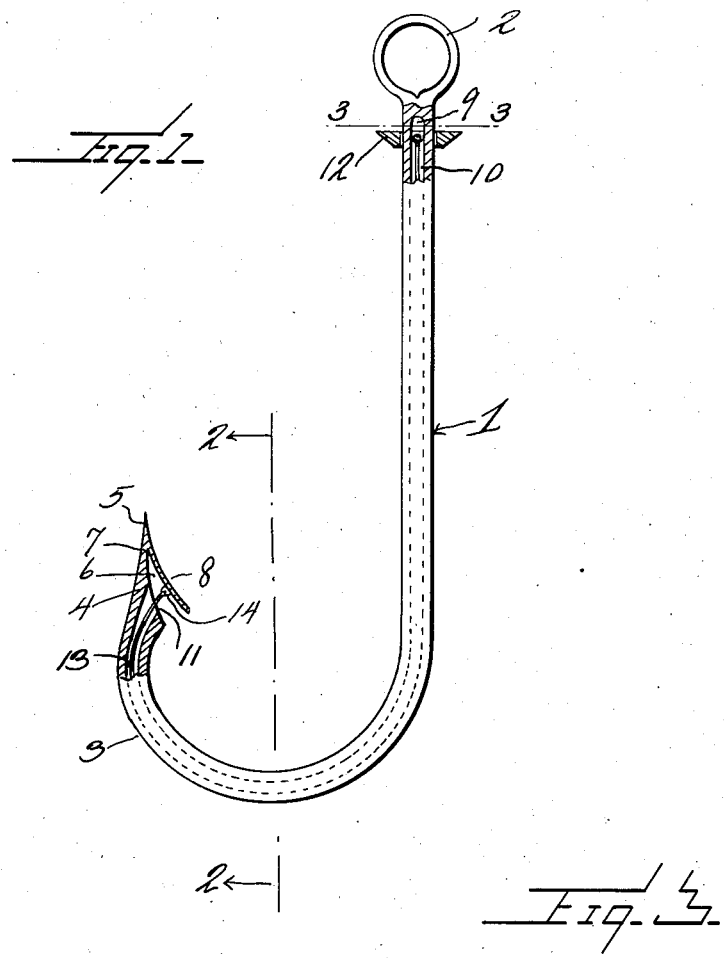
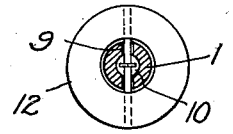
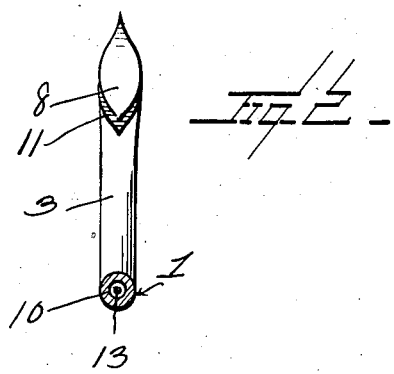
Inventor
Leonard Ward
By Watson E. Coleman
Attorney Patented Oct. 15, 1940

2,217,928

UNITED STATES PATENT OFFICE 2,217,928

FISHHOOK

Leonard Ward, Alamota, Kans.

Application March 23, 1939, Serial No. 263,753

9 Claims. (Cl. 43—27)

This invention relates generally to the class of fishing and trapping and pertains particularly to improvements in fishhooks.

The primary object of the present invention is to provide an improved fishhook in which means is employed for retracting the barb so as to facilitate the removal of the hook from the mouth or the body of a fish.

Another object of the invention is to provide an improved fishhook with a movable barb, with means connected with the barb which is operable from the eyed end of the hook shank for drawing the barb in toward the adjacent body portion of the hook so that the hook may be removed from the mouth or body of the fish without injuring the same.

In fishing, particularly in fishing for trout, bass or other game fish, it is frequently required of the fisherman that fish under a prescribed size be returned to the water when caught. When using the ordinary type of barbed hook, it is practically impossible to remove the hook from the mouth or from the body of the fish without injuring the fish to such an extent that it either dies from the injury, is exposed to infection which eventually kills it or is so weakened that it becomes easy prey to other fish. By the provision of the hook of a type embodying the present invention, it is possible to remove the barb with a minimum of damage to the flesh of the fish so that when the fish is returned to the water, its chances of surviving are much greater than would be the case if it were caught upon a hook of the ordinary type.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the hook embodying the present invention, portions of the same being in section.

Fig. 2 is a section on the line 2—2 of Fig. 1.

Fig. 3 is a sectional view on the line 3—3 of Fig. 1, showing a conventional manner of coupling the barb actuating wire to the control ring.

Referring now more particularly to the drawing, the numeral 1 designates the shank portion of a hook constructed in accordance with the present invention, at one end of which shank an eye 2 is formed for the attachment of a line while the other end of the shank is curved in the usual manner to form the hook bill 3.

In accordance with the present invention, the end of the hook bill 3 is slightly thickened, as indicated at 4, and is shaped or cut to form the point 5. From the inner side of the thickened portion 4 the bill is cut transversely and obliquely with respect to its length, as indicated at 6, and as is clearly shown, this cut extends toward the point 5, so that the body of the bill at the outer part of the thickened portion 4 is made relatively thin at the point 7 and there is formed the portion 8 which constitutes the barb.

Adjacent the outer end of the shank 1 in close proximity to the eye 2, the shank is provided in its side wall with the longitudinally extending short slot 9, which leads into a small bore or passage 10 which extends from the slot through the length of the shank and the bill to the cut out portion 6 into which it opens toward the underside of the barb 8, as shown in Fig. 1, the inner end of the passage being designated 11.

Surrounding the end of the shank 1 adjacent the slot 9 is a collar 12 and attached to this collar in a suitable manner as shown in Fig. 3 is an end of a wire 13 which extends through the passage 10 and out at the end thereof adjacent the barb 8 where it has its end connected in a suitable manner as by soldering or otherwise as indicated at 14, to the underside of the barb. The structure of Fig. 3 illustrates conventionally a method by which the wire 13 may be coupled with the collar 12.

Due to the resiliency of the metal from which the hook is cut and to the thinness of the portion of the hook adjacent the barb, that is, the part 7 of the hook point, it will be readily seen that whereas the barb may be initially formed to stand out from the portion 4 of the hook bill, there will be sufficient resiliency to permit the barb to be drawn in so as to close the slit 6, the point of the barb coming to rest against the adjacent surface of the thickened portion 4, so that it will be entirely protected. By the provision of the actuating wire 13, this flexing of the barb 8 may be accomplished from the eyed end of the shank and thus it will be readily seen that when it is desired to remove the point of the hook from a fish without injuring the fish, the fisherman merely has to engage his two first fingers under the collar 12 and his thumb against the eye 2 and by then pulling the collar toward the eye, the wire will be drawn in so as to retract the bill 8 to the position where the hook point can be extracted from the body of the fish without injuring the latter.

What is claimed is:

1. A fishhook having a retractible flexible barb, in which the point is directed downwardly and inwardly with respect to the bight of the hook, and means for flexing the barb.

2. A fishhook having a resilient barb adapted to be flexed inwardly toward the adjacent body of the hook, and means connected with the barb for flexing it into retracted position against the body of the hook, from a point remote from the hook point.

3. A fishhook having a shank and bill portion, said bill portion terminating in a thickened part which is drawn off to form a point, a barb forming an integral part of said thickened part of the bill, the barb being resiliently joined to said thickened part and having its point normally spaced from said thickened part and directed across the bill toward said shank, and means connected with the barb and operable from a position on the shank to flex the barb inwardly toward said thickened portion.

4. A fishhook having a shank and bill portion, said bill portion terminating in a thickened part which is drawn off to form a point, a barb forming an integral part of said thickened part of the bill, the barb being resiliently joined to said thickened part and having its point normally spaced from said thickened part and directed across the bill toward said shank, said shank and bill having a passage formed therein which opens through said thickened part of the bill toward the underside of the barb, the passage being open at its other end through a side of the shank, a wire extending through and slidable in said passage and having one end attached to the underside of the barb, and means carried by the shank adjacent the said opening for the other end of the passage and connected with the wire for effecting the shifting of the same and retraction of the barb.

5. In a fishhook, a shank, a bill portion, said bill portion terminating in a thickened part which is drawn out to form a point, a barb attached at one end to said thickened part and movable with respect to the latter, and means connected with the barb whereby the other end thereof may be moved relatively to the thickened 6. A fishhook, comprising a shank and bill portion, said bill portion terminating in a point, a barb connected with the bill portion adjacent the point and arranged to normally have the major portion thereof spaced from the adjacent part of the bill whereby the barb will project substantially obliquely of the bill with the other end thereof directed toward the shank, means whereby said barb may be moved to have the free end thereof brought into close proximity to the adjacent part of the bill, and means for effecting the said movement of the barb from a point on the shank remote from the barb.

7. A fishhook having a shank and a bill, said bill having formed integrally therewith a flexible barb which, throughout the major portion of its length, is separated from an obliquely directed end face of the bill, the barb having its free end directed inwardly and downwardly toward the bight portion of the hook and being adapted to be flexed toward and away from the said oblique portion of the bill, and means connected with the barb for flexing it toward the said adjacent oblique portion of the bill whereby to move the pointed free end of the barb into a position adjacent the obliquely directed portion of the bill to facilitate the withdrawal of the bill from a body.

8. A fishhook having a point and a retractible flexible barb in which the point of the barb is directed downwardly and inwardly with respect to the bight of the hook and oppositely to the point of the hook, and means for flexing the barb to move the point thereof relative to the adjacent part of the hook body.

9. A fishhook having a point and a retractible flexible barb in which the point of the barb is directed downwardly and inwardly with respect to the bight of the hook and oppositely to the point of the hook, and means coupled with the barb and shiftable from a point remote from the barb to effect the flexing of the barb and movement of the point thereof nearer to the adjacent body portion of the hook.

LEONARD WARD.